US010096292B2

United States Patent
Chen et al.

(10) Patent No.: US 10,096,292 B2
(45) Date of Patent: Oct. 9, 2018

(54) LIQUID CRYSTAL DISPLAY SYSTEMS AND RELATED METHODS WITH PIXEL ELEMENTS DRIVEN AT DIFFERENT FREQUENCIES

(71) Applicant: a.u. Vista Inc., Milpitas, CA (US)

(72) Inventors: Hai-Wei Chen, Orlando, FL (US);
Shin-Tson Wu, Orlando, FL (US);
Yi-Fen Lan, Taichung (TW);
Cheng-Yeh Tsai, Hsinchu (TW)

(73) Assignees: A.U. VISTA INC., Milpitas, CA (US);
THE UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 134 days.

(21) Appl. No.: 15/054,235

(22) Filed: Feb. 26, 2016

(65) Prior Publication Data
US 2017/0249917 A1    Aug. 31, 2017

(51) Int. Cl.
*G09G 3/36* (2006.01)
*G02F 1/1343* (2006.01)
*G02F 1/137* (2006.01)

(52) U.S. Cl.
CPC ......... *G09G 3/3648* (2013.01); *G09G 3/3614* (2013.01); *G02F 2001/13793* (2013.01);
(Continued)

(58) Field of Classification Search
CPC ......... G09G 2340/0457; G09G 3/3607; G09G 3/36; G09G 5/10; G09G 3/2003; G09G 5/02; G09G 3/3614; G09G 3/3648; G09G 2320/02; G09G 2320/028; G09G 3/2074; G09G 2300/0439; G09G 2320/0247; G09G 2320/0252; G09G 2340/0435; G09G 2340/16; G09G 3/3266; G09G 3/3275;
(Continued)

(56) References Cited

U.S. PATENT DOCUMENTS 7,369,204 B1    5/2008 Choi et al.
2004/0085272 A1*    5/2004 Ting .................. G02F 1/133707
                                                                345/87
(Continued)

FOREIGN PATENT DOCUMENTS

TW    201007318        2/2010
TW    201407247 A      2/2014

OTHER PUBLICATIONS

English Translation of TW 201007318.*

*Primary Examiner* — Hong Zhou
(74) *Attorney, Agent, or Firm* — McClure, Qualey & Rodack, LLP

(57) ABSTRACT

Liquid crystal display (LCD) systems and related methods with pixel elements driven at different frequencies are provided. A representative LCD system includes: a plurality of pixel elements arranged in an array, each of the plurality of pixel elements having a first sub-region and a second sub-region; a low-frequency driving circuit operative to drive each of the first sub-regions; and a high-frequency driving circuit operative to drive each of the second sub-regions at a driving frequency different than a driving frequency of the low-frequency driving circuits; wherein the first sub-regions exhibit a different size than the second sub-regions.

23 Claims, 7 Drawing Sheets

(52) U.S. Cl.
CPC ............... *G09G 2320/041* (2013.01); *G09G 2340/0435* (2013.01)

(58) Field of Classification Search
CPC .... G09G 3/3611; G09G 3/3688; G09G 5/003; G02F 1/133514; G02F 2201/52; G02F 1/134309; G02F 2001/134345; G02F 1/13394; G02F 1/13306; G02F 1/133528; G02F 1/13439; G02F 1/136286; G02F 2001/13712; G02F 2201/123; G02F 2001/13793
USPC .................................... 345/87–102, 204–214
See application file for complete search history.

(56) References Cited

U.S. PATENT DOCUMENTS

| | | | |
|---|---|---|---|
| 2008/0198290 A1* | 8/2008 | Su | G02F 1/13624 349/48 |
| 2010/0053528 A1* | 3/2010 | Li | G02F 1/134309 349/124 |
| 2011/0248970 A1* | 10/2011 | Koyama | G02F 1/13452 345/204 |
| 2012/0327350 A1* | 12/2012 | Chang | G02F 1/133371 349/139 |
| 2013/0027439 A1* | 1/2013 | Kim | G09G 3/003 345/690 |
| 2014/0043567 A1 | 2/2014 | Chen et al. | |

\* cited by examiner

LIQUID CRYSTAL DISPLAY SYSTEMS AND RELATED METHODS WITH PIXEL ELEMENTS DRIVEN AT DIFFERENT FREQUENCIES

BACKGROUND

Technical Field

The disclosure generally relates to liquid crystal displays.

Description of the Related Art

Liquid crystal displays (LCDs) are widely used in electronic devices, such as laptops, smart phones, digital cameras, billboard-type displays, and high-definition televisions.

LCD panels may be configured as disclosed, for example, in Wu et al., U.S. Pat. No. 6,956,631, which is assigned to AU Optronics Corp., the parent company of the assignee of the current application, and hereby incorporated by reference in its entirety. As disclosed in Wu et al. FIG. 1, the LCD panel may comprise a top polarizer, a lower polarizer, a liquid crystal cell, and a back light. Light from the back light passes through the lower polarizer, through the liquid crystal cell, and then through the top polarizer. As further disclosed in Wu et al. FIG. 1, the liquid crystal cell may comprise a lower glass substrate and an upper substrate containing color filters. A plurality of pixels comprising thin film transistor (TFT) devices may be formed in an array on the glass substrate, and a liquid crystal compound may be filled into the space between the glass substrate and the color filter forming a layer of liquid crystal material.

As explained in Sawasaki et al., U.S. Pat. No. 7,557,895, which is assigned to AU Optronics Corp., the parent company of the assignee of the current application, and hereby incorporated by reference in its entirety, the thickness of the liquid crystal layer typically must be uniformly controlled, in order to avoid unevenness in brightness across the LCD panel. As disclosed in Sawasaki et al., the required uniformity may be achieved by disposing a plurality of pillar spacers between the TFT substrate and the color filter substrate. As further disclosed in Sawasaki et al., the pillar spacers may be formed with different heights, such that some spacers have a height that is greater than the gap between the substrates and other spacers have a height that is less than the gap between the substrates. This configuration may permit the spacing between the substrates to vary with temperature changes but also prevent excessive deformation when forces are applied to the panel.

Sawasaki et al. further discloses a method for assembling the substrates with the liquid crystal material between them. This method comprises steps of preparing the two substrates, coating a sealing material on the circumference of the outer periphery of one of the pair of substrates, dropping an appropriate volume of liquid crystal on one of the pair of substrates, and filling in the liquid crystal between the pair of substrates by attaching the pair of substrates in a vacuum followed by returning the attached pair of substrates to atmospheric pressure.

In LCD panels, the semiconductor material making up the TFT channel may be amorphous silicon. However, as disclosed in Chen, U.S. Pat. No. 6,818,967, which is assigned to AU Optronics Corp., the parent company of the assignee of the current application, and hereby incorporated by reference in its entirety, poly-silicon channel TFTs offer advantages over amorphous silicon TFTs, including lower power and greater electron migration rates. Poly-silicon may be formed by converting amorphous silicon to poly-silicon via a laser crystallization or laser annealing technique. Use of the laser permits fabrication to occur at temperatures below 600° C., and the fabricating technique is thus called low temperature poly-silicon (LTPS). As disclosed in Chen, the re-crystallization process of LTPS results in the formation of mounds on the surface of the poly-silicon layer, and these mounds impact the current characteristics of the LTPS TFT. Chen discloses a method to reduce the size of the LTPS surface mounds, by performing a first anneal treatment, then performing a surface etching treatment, for example using a solution of hydrofluoric acid, and then performing a second anneal treatment. The resulting LTPS surface has mounds with a height/width ratio of less than 0.2. A gate isolation layer, gate, dielectric layer, and source and drain metal layers can then be deposited above the LTPS layer to form a complete LTPS TFT.

As disclosed in Sun et al., U.S. Pat. No. 8,115,209, which is assigned to AU Optronics Corp., the parent company of the assignee of the current application, and hereby incorporated by reference in its entirety, a disadvantage of LTPS TFTs compared to amorphous silicon TFTs is a relatively large leakage current during TFT turn off. Use of multiple gates reduces leakage current, and Sun et al. discloses a number of different multi-gate structures for a polycrystalline silicon TFT, including those shown in Sun et al. FIGS. 2A-2B and 3-6.

As is well-known in the art, commonly-used liquid crystal molecules exhibit dielectric anisotropy and conductive anisotropy. As a result, the molecular orientation of liquid crystals can be shifted under an external electric field. By varying the strength of the external electric field, the brightness of the light that passes through the polarizers and the liquid crystal material can be controlled. By applying different electric fields within different pixels of the array, and by providing different color filters for different pixels, the brightness and color of the light passing through each point in the LCD panel can be controlled, and a desired image formed. Such LCDs employ a variety of liquid crystal (LC) mixtures that have been developed to exhibit a range of operating and performance characteristics.

For instance, polymer stabilized blue phase liquid crystal (PS-BPLC) is attractive for use in displays due to some revolutionary features, e.g., no need for an alignment layer, fast response time, and an isotropic dark state. However, PS-BPLC generally requires a high operation voltage because of its relatively rigid polymer network.

From a materials perspective, large dielectric anisotropy ($\Delta\varepsilon$) LC mixtures (e.g., $\Delta\varepsilon > 50$) have been developed and employed to generate a large Kerr constant, with a correspondingly lower operation voltage. However, these LC mixtures exhibit a long molecular conjugation length and large dipole moment, resulting in a very high viscosity. Meanwhile, the dielectric constant of BPLC host follows the Debye relaxation:

$$\Delta\varepsilon = \Delta\varepsilon_\infty + \frac{\Delta\varepsilon_0 - \Delta\varepsilon_\infty}{1 + (f/f_r)^2}, \qquad (1)$$

in which $f_r$ is the relaxation frequency and is related to the rotational viscosity $\eta$ and molecule length l as:

$$f_r = \frac{1}{\eta l^3}. \qquad (2)$$

Due to the very high viscosity and long molecular length, the relaxation frequency of high Δε BPLC host is quite low. Unfortunately, such a low relaxation frequency may bring two unwanted challenges: 1) insufficient charging time, and 2) high temperature sensitivity. The challenge of insufficient charging time may be addressed by some novel circuit designs, several of which are disclosed in various publications, such as: C.-D. Tu, et al. J. Display Technol. 9(1), 3 (2013); C.-L. Lin, et al. IEEE Electron Device Letter, 36(4), 354 (2015); C.-L. Lin, et al. US Patent Publication No. 2015/0262542 A1; and, C.-L. Lin, et al. US Patent Publication No. 2015/0277177 A1, for example. However, little progress has been achieved in addressing the issue of temperature sensitivity.

As mentioned above, for a large-Δε BPLC, the Debye relaxation frequency is as low as several kHz. Hence, the Kerr constant strongly depends on the working temperature and driving frequency [F. Peng, et al. J. Mater. Chem. C, 2, 3597 (2014)]:

$$K = A \frac{\exp\left[\frac{E_1}{k_B}\left(\frac{1}{T} - \frac{1}{T_c}\right)\right]}{1 + (f/f_0)^2 \exp(E_2/k_B T)}, \quad (3)$$

where K is the Kerr constant, A is the proportionality constant, $k_B$ is the Boltzmann constant, and $T_c$ is the clearing temperature.

As can be seen from FIG. 1, the Kerr constant of a typical large Δε BPLC host BP07 (Δε~300) decreases from 27.5 nm/V² to 15 nm/V², when the temperature increases from 10° C. to 30° C. In such a narrow temperature interval, the Kerr constant changes by approximately a factor of two, and may lead to dysfunction of a display in which the LC mixture is used.

Accordingly, there is a desire to reduce the temperature sensitivity and widen the working temperature range of large Δε LC mixtures, such as PS-BPLC.

SUMMARY

Liquid crystal display systems and related methods with pixel elements driven at different frequencies are provided. In one embodiment, a liquid crystal display (LCD) comprises: a plurality of pixel elements arranged in an array, each of the plurality of pixel elements having a first sub-region and a second sub-region; a low-frequency driving circuit operative to drive each of the first sub-regions; and a high-frequency driving circuit operative to drive each of the second sub-regions at a driving frequency different than a driving frequency of the low-frequency driving circuits; wherein the first sub-regions exhibit a different size than the second sub-regions.

In another embodiment, a method of driving an LCD comprises: providing an LCD having a plurality of pixel elements arranged in an array, and a plurality of driving circuits for driving the plurality of pixel elements; driving a first sub-region of each of the pixel elements at a first driving frequency; and driving a second sub-region of each of the pixel elements at a second driving frequency different than the first driving frequency; wherein the first sub-regions exhibit a different size than the second sub-regions.

In still another embodiment, an LCD system comprises: a pixel element having a first sub-region and a second sub-region; a low-frequency driving circuit disposed on the first sub-region; a high-frequency driving circuit disposed on the second sub-region; a plurality of date lines, with a first of the date lines being coupled to the low-frequency driving circuit and a second of the data lines being coupled to the high-frequency driving circuit; and a plurality of gate lines, with a first of the gate lines being coupled to the low-frequency driving circuit and a second of the gate lines being coupled to the high-frequency driving circuit.

In yet another embodiment, a method of driving an LCD having a plurality of pixel elements arranged in an array, comprises: driving a first sub-region of each of the pixel elements, at a first driving frequency, according to a first data signal communicated by a first data line; and driving a second sub-region of each of the pixel elements, at a second driving frequency different than the first driving frequency, according to a second data signal communicated by a second data line.

Other objects, features, and/or advantages will become apparent from the following detailed description of the preferred but non-limiting embodiments. The following description is made with reference to the accompanying drawings.

DETAILED DESCRIPTION

For ease in explanation, the following discussion describes embodiments of the present disclosure in the context of an LCD system. It is to be understood that the invention is not limited in its application to the details of the particular arrangements shown since the invention is capable of other embodiments. Also, the terminology used herein is for the purpose of description and not of limitation.

In this regard, LCD systems and related methods with pixel elements driven at different frequencies are provided. As will be described in greater detail below, such systems and methods may involve the use of large $\Delta\varepsilon$ LC materials (e.g., PS-BPLCD) that exhibit reduced temperature sensitivity. The preferred embodiments of the present invention will now be described with reference to the drawings.

Figure 2:
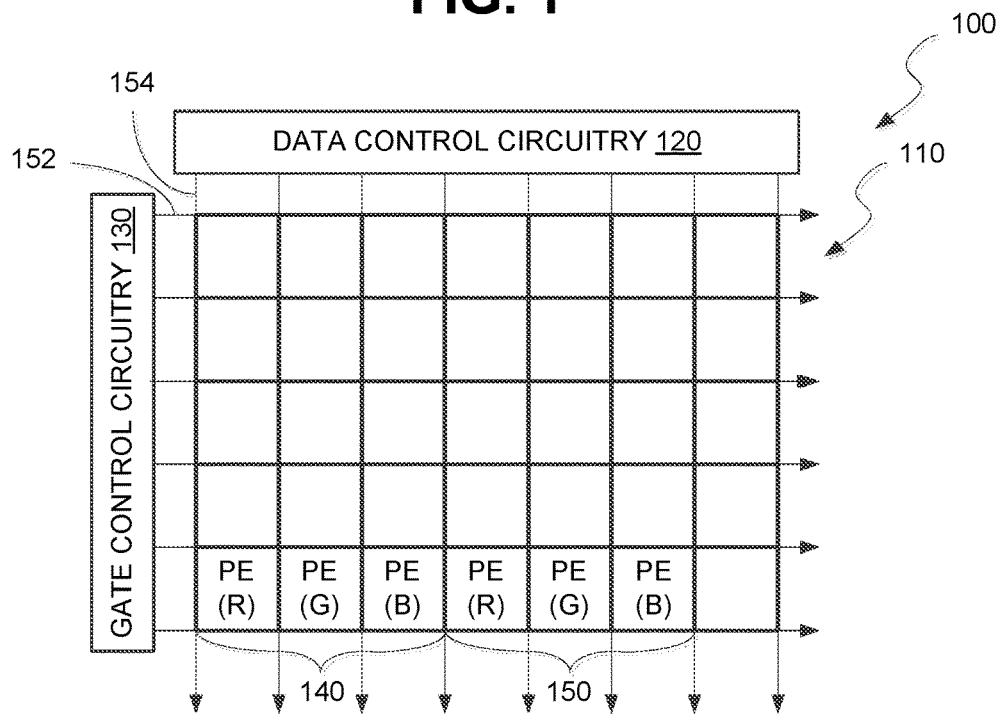
FIG. 2 is a schematic diagram of an embodiment of an LCD system.

With reference to FIG. 2, an embodiment of an LCD system 100 is depicted. Fundamentally, LCD system 100 includes an LCD panel 110 with a plurality of pixels, data control circuitry 120 and gate control circuitry 130. The circuits and functions in the embodiments of the present invention can be implements by hardware, software or a combination of hardware and software such as microcontrollers, application-specific integrated circuits (ASIC) and programmable microcontrollers.

In keeping with the description of FIG. 2, LCD panel 110 incorporates a plurality of pixels (typically thousands of pixels, e.g., pixels 140, 150), which are arranged in a two-dimensional array comprising a plurality of rows and columns. For ease in illustration, only a few pixels are illustrated in FIG. 2. As is known, in a thin film transistor (TFT) LCD panel, a pixel is typically formed from three pixel elements (PEs): one red, one green, and one blue, although various configurations may be used. For instance, pixel 150 is depicted as including three PEs—PE(R), PE(G) and PE(B). One or more transistors and one or more storage capacitors are typically coupled to each pixel element, thereby forming driving circuitry for the associated pixel element.

The transistors of all pixels in a given row typically have their gate electrodes connected to a gate line (e.g., line 152), and their source electrodes connected to a data line (e.g., line 154). The gate control circuitry 130 and data control circuitry 120 control the voltage applied to the respective gate and data lines to individually address each pixel element in the LCD panel. By controllably pulsing the respective pixel element driving transistors, the driving circuits can control the transmissivity of each PE, and thereby control the color of each pixel. The storage capacitors assist in maintaining the charge across each pixel between successive pulses (which are delivered in successive frames).

Figure 1:
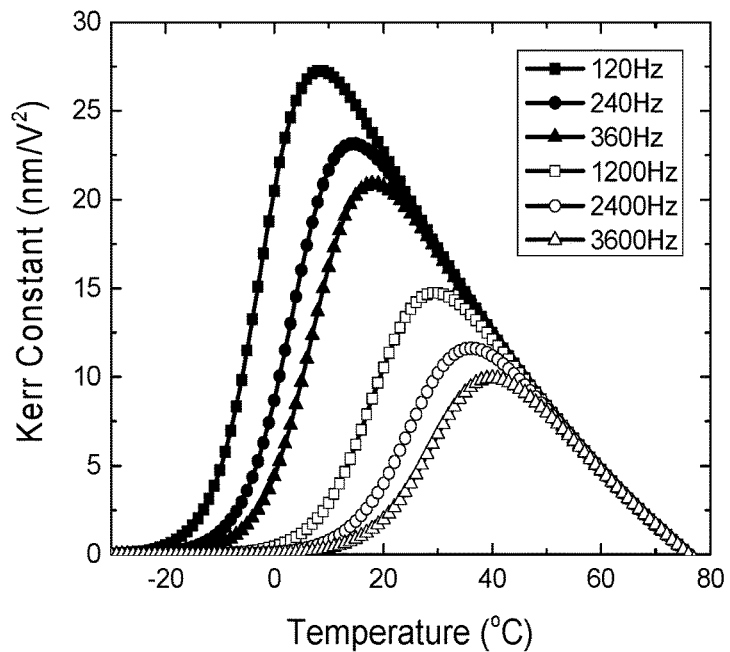
FIG. 1 is a diagram illustrating temperature dependent Kerr constants of a representative polymer stabilized blue phase liquid crystal mixture (BP07) at different driving frequencies.
Figure 3:
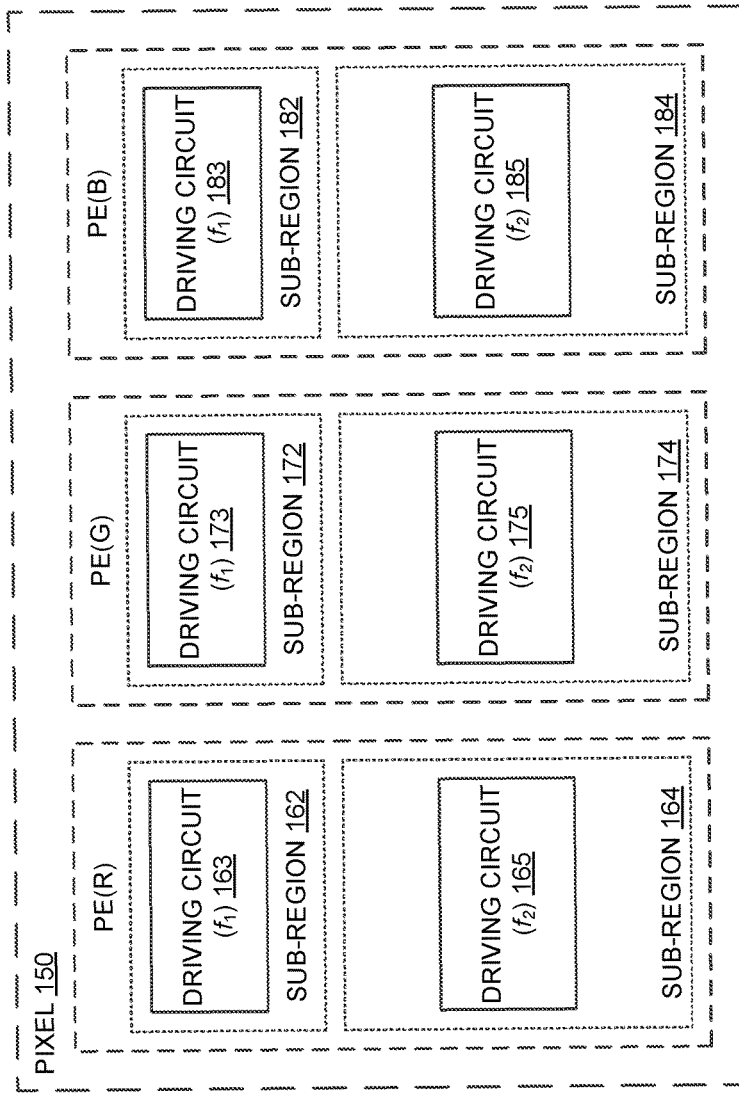
FIG. 3 is a schematic diagram of an embodiment of a pixel.

An embodiment of a pixel 150 that may be implemented in an LCD system (such as LCD system 100 of FIG. 1) is depicted schematically in FIG. 3. As shown in FIG. 3, pixel 150 incorporates three PEs—a red PE, a green PE and a blue PE, denoted by PE(R), PE(G) and PE(B), respectively. Each of the PEs is divided into two sub-regions that share the structural components of a PE (e.g., a corresponding color filter). Additionally, each sub-region is associated with a dedicated driving circuit. Specifically, PE(R) includes sub-regions 162, 164, PE(G) includes sub-regions 172, 174, and PE(B) includes sub-regions 182, 184. The sub-regions 162, 164, 172, 174, 182 and 184 are associated with driving circuits 163, 165, 173, 175, 183 and 185, respectively. Notably, driving circuits 163, 173 and 183 operate at a different driving frequency ($f_1$) than the driving frequency ($f_2$) of driving circuits 165, 175 and 185.

In some embodiments, driving circuits 163, 173 and 183 can be configured as low-frequency driving circuits for operating at a driving frequency lower than the driving frequency of driving circuits 165, 175 and 185 (thus, becoming high-frequency driving circuits). By way of example, the low-frequency driving circuits are driven at 120Hz and the high-frequency driving circuits are driven at 360Hz. Preferably, the driving frequencies of the driving circuits are in the range of approximately 60Hz to approximately 480Hz. Other frequencies also are applicable (e.g., 1200Hz), however, such frequencies may introduce issues (e.g., charging issues). Additionally, the driving frequency of the high-frequency driving circuits is preferably a multiple of the driving frequency of the low-frequency driving circuits (e.g., 120Hz*3=360Hz).

Each of sub-regions 162, 172 and 182 (although similar in size with respect to each other) are different in size than the sub-regions 164, 174 and 184. In this embodiment, sub-regions 162, 172 and 182 are smaller in size (i.e., correspond to a smaller area when viewed in plan view) than sub-regions 164, 174 and 184. Preferably, the ratio of the areas of the sub-regions for a PE is in the range of 1 to approximately 10, although other ratios may be used. For example, the ratio of the area of the sub-region 162 to the sub-region 164 is 1:2 and as a result the area of the sub-region 162 is smaller than the sub-region 164. In another case, the ratio of the area of the sub-region 162 to the sub-region 164 is 0.1:1 and as a result the area of the sub-region 162 is bigger than the sub-region 164. In other case, the ratio of the area of the sub-region 162 to the sub-region 164 is 1:1 and as a result the area of the sub-region 162 is equal to the sub-region 164. In some embodiments, the size of the larger sub-regions is at least approximately 2 times the size of the smaller sub-regions. It should be noted that the selection of sub-region sizes (as with driving frequency) may be based on a variety of factors such as LC materials, electrode structures, and required working temperature range, among others.

In the embodiment of FIG. 3, the smaller sub-regions 162, 172 and 182 are driven by the associated driving circuits at lower driving frequencies than the frequencies used for driving the larger sub-regions 164, 174 and 184. In other embodiments, the smaller sub-regions are driven at higher driving frequencies than the frequencies used for driving the larger sub-regions. In such an embodiment, however, the working temperature range will likely be influenced more by low frequency driving since the area of the sub-regions driven by the low-frequency driving circuits would be larger than that driven by the high-frequency driving circuits.

Figure 4:
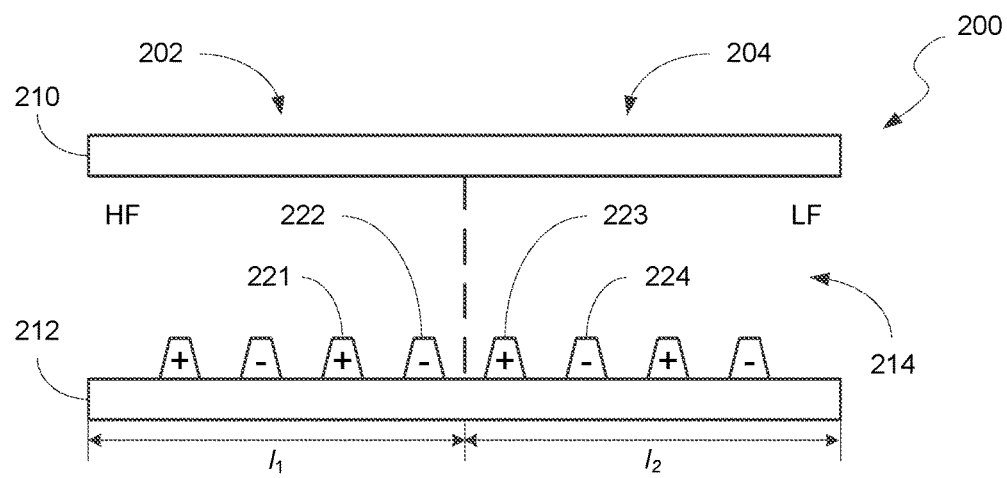
FIG. 4 is a schematic, side view of an embodiment of an LCD system.

FIG. 4 is a schematic, side view of an embodiment of an LCD system 200 that includes sub-regions 202 and 204, with the sub-regions being operated at different driving frequencies. In particular, sub-region 202 is driven at high frequency (HF) and sub-region 204 is driven at low frequency (LF).

As shown in FIG. 4, LCD system 200 is configured as an in-plane switching (IPS) LCD panel that incorporates an upper substrate 210, a lower substrate 212 and a large $\Delta\varepsilon$ LC mixture 214 sandwiched between the substrates. It should be noted that for TFT-grade nematic LCs, dielectric anisotropy is usually $\Delta\varepsilon<10$ in order to obtain low viscosity. However, for blue phase LCDs, in order to reduce operation voltage, an LC host with $\Delta\varepsilon>50$ is often chosen—a large $\Delta\varepsilon$ LC mixture. Some commercially available blue phase LC hosts exhibit $\Delta\varepsilon>100$.

LC mixture 214 includes liquid crystal molecules that exhibit optical isotropicity. In this embodiment, the liquid crystal molecules are BPLC, with BP07 ($\Delta\varepsilon\sim300$) being used as the BP host. However, in other embodiments, various other large $\Delta\varepsilon$ LC mixtures may be used, such as uniformly standing helix LCs, uniformly lying helix LCs or other LC modes, for example.

Sub-regions 202 and 204 exhibit equal lengths ($l_1=l_2$), with the electrodes being formed on lower substrate 212. The electrodes (e.g., electrodes 221, 222, 223 and 224)

exhibit the same width/gap and the same height. For example, the width/gap is 3μm/10μm and the protrusion height is 3.5 μm. It should be noted that, in other embodiments, various other electrode configurations may be used, such as fringe-field switching (FFS) and vertical field switching (VFS), for example.

To reduce the temperature sensitivity of Kerr constant, pixels of sub-region 202 are operated at a higher driving frequency (or frame rate) than the driving frequency of pixels of sub-region 204. Since the optimal temperature ($T_{op}$) with highest Kerr constant is different for each frequency (e.g., 8° C. for 120Hz and 18° C. for 360Hz), by combining sub-regions 202 and 204, the pixels of the LCD panel exhibit wider working temperature ranges.

Figure 5:
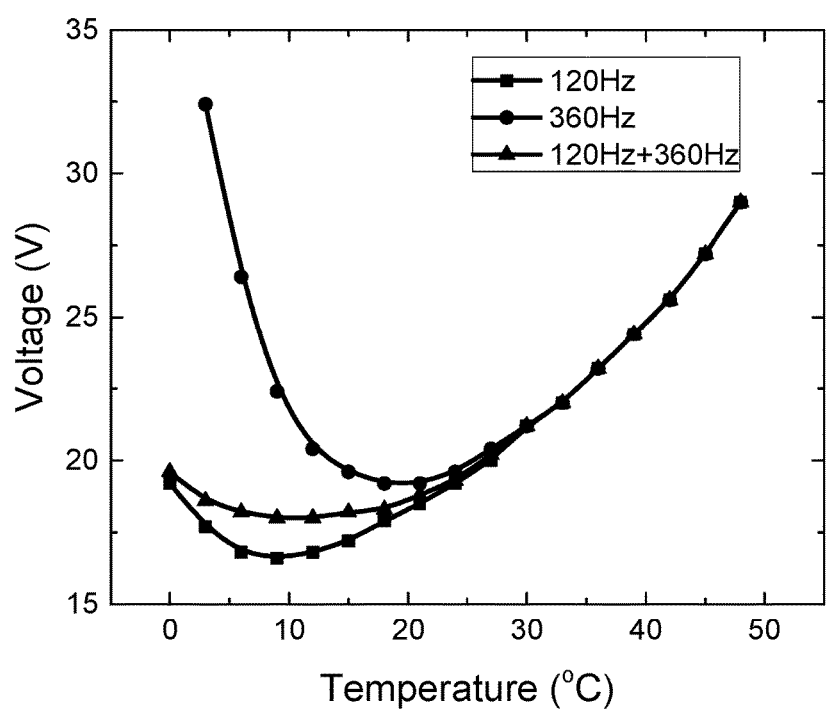
FIG. 5 is a diagram illustrating simulated temperature dependent operation voltages for different driving frequencies (120Hz and 360Hz) and frequency combination (120Hz+360Hz) based on the embodiment of FIG. 4.

FIG. 5 illustrates simulated temperature dependent operation voltages for different driving frequencies (120Hz and 360Hz) and frequency combination (120Hz+360Hz) based on the embodiment of FIG. 4. As shown in FIG. 5, for single frequency driving (e.g. 120Hz or 360Hz), the temperature range ($V_{op}$+1.0 V) is about 10° C., which is much narrow for regular usage. But when dual frame rates are employed, the temperature range nearly doubles, including the room temperature. Moreover, the device parameters (e.g., areas of sub-pixels, electrode structures, protrusion height of electrodes, etc.) could be optimized to further enlarge the temperature range. Also, if higher driving frequency is acceptable, then better performance could be obtained.

Figure 6:
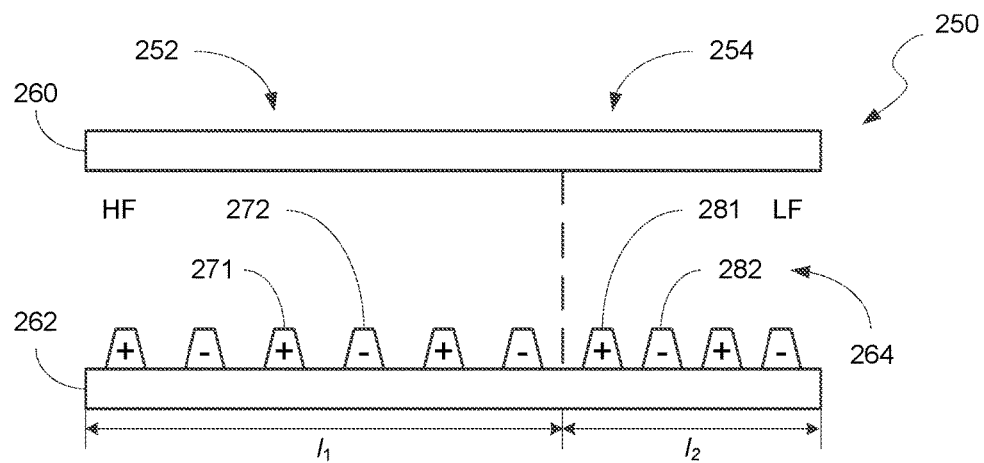
FIG. 6 is a schematic, side view of another embodiment of an LCD system.

FIG. 6 is a schematic, side view of another embodiment of an LCD system 250 configured as an IPS LCD panel that incorporates an upper substrate 260, a lower substrate 262 and a large Δε LC mixture 264 (e.g., BP07) sandwiched between the substrates. As shown in FIG. 6, the LCD system 250 is divided into two sub-regions 252 and 254, with sub-region 252 (HF sub-region) being operated at a higher driving frequency than the driving frequency of sub-region 254 (LF sub-region).

Sub-regions 252 and 254 exhibit different lengths ($l_1 \neq l_2$, and $l_1:l_2=4:1$) and different electrode configurations. In particular, the electrodes are formed on lower substrate 262, with electrodes of sub-region 252 (e.g., electrodes 271, 272) exhibiting a width/gap of 3μm/10μm, and electrodes of sub-region 254 (e.g., electrodes 281, 282) exhibiting a width/gap of 3μm/8.5μm. Height of the electrodes is 3.5 μm for both sub-regions.

Figure 7:
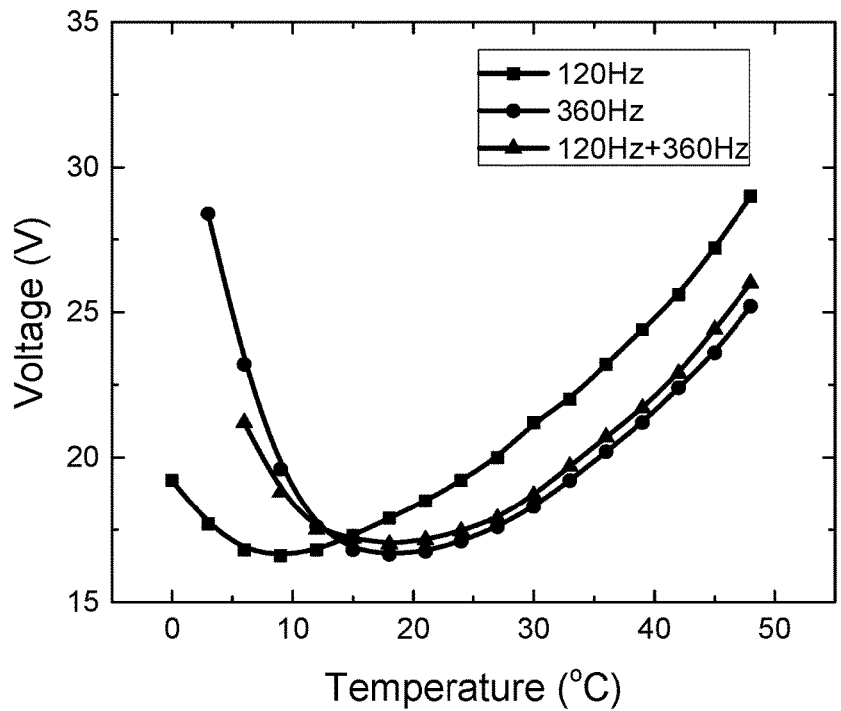
FIG. 7 is a diagram illustrating simulated temperature dependent operation voltages for different driving frequencies (120Hz and 360Hz) and frequency combination (120Hz+360Hz) based on the embodiment of FIG. 6.

FIG. 7 illustrates simulated temperature dependent operation voltages for different driving frequencies (120Hz and 360Hz) and frequency combination (120Hz+360Hz) based on the embodiment of FIG. 6. As can be seen, the optimal temperature range is widened compared to that shown in FIG. 5. Potentially more significantly, the range is shifted to high temperature, where room temperature (22° C.) is centered. As such, this performance may be more preferable for commercial applications.

Figure 8:
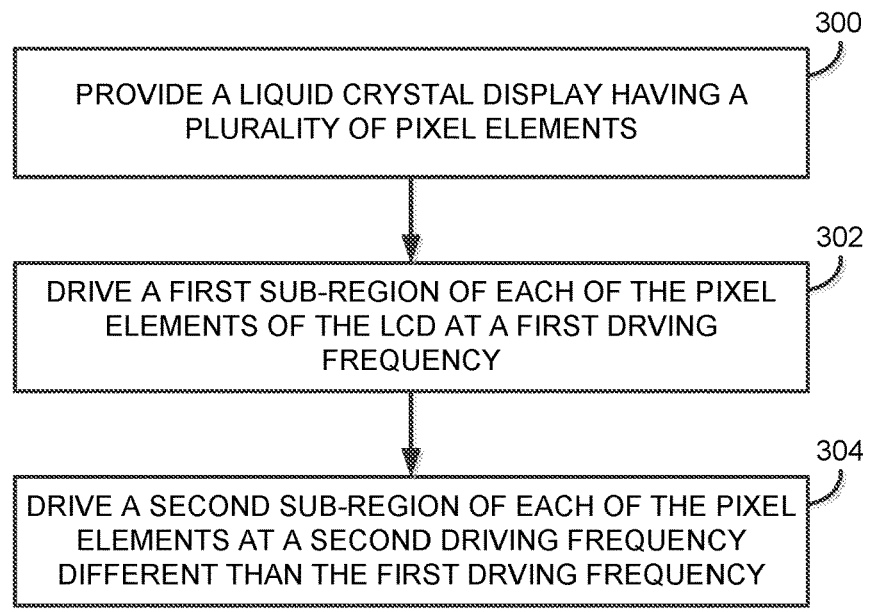
FIG. 8 is a flowchart illustrating basic operations in accordance with an embodiment.

FIG. 8 is a flowchart illustrating basic operations in accordance with an embodiment. As shown in FIG. 8, the functionality (or method) associated with driving an LCD is construed as beginning at block 300, in which an LCD is provided. In particular, the LCD includes a plurality of pixel elements arranged in an array having a plurality of column and a plurality of rows, and a plurality of driving circuits for driving the plurality of pixel elements. In some embodiments, each of the plurality of pixel elements is associated with two driving circuits. An example embodiment of a pixel element with two driving circuits will be described in detail with respect to FIG. 9.

In block 302, a first sub-region of each of the pixel elements is driven at a first driving frequency, such as is performed by a first driving circuit. In block 304, a second sub-region of each of the pixel elements is driven at a second driving frequency different than the first driving frequency. This is performed by a second driving circuit. Notably, the first sub-region of each of the pixel elements exhibits the first size and the second sub-region of each of the pixel elements exhibits the second size different than the first size. Thus, in some embodiments, the larger sub-regions are driven at higher frequencies than the driving frequencies of the smaller sub-regions while, in other embodiments, the larger sub-regions are driven at lower frequencies than the smaller sub-regions.

Figure 9:
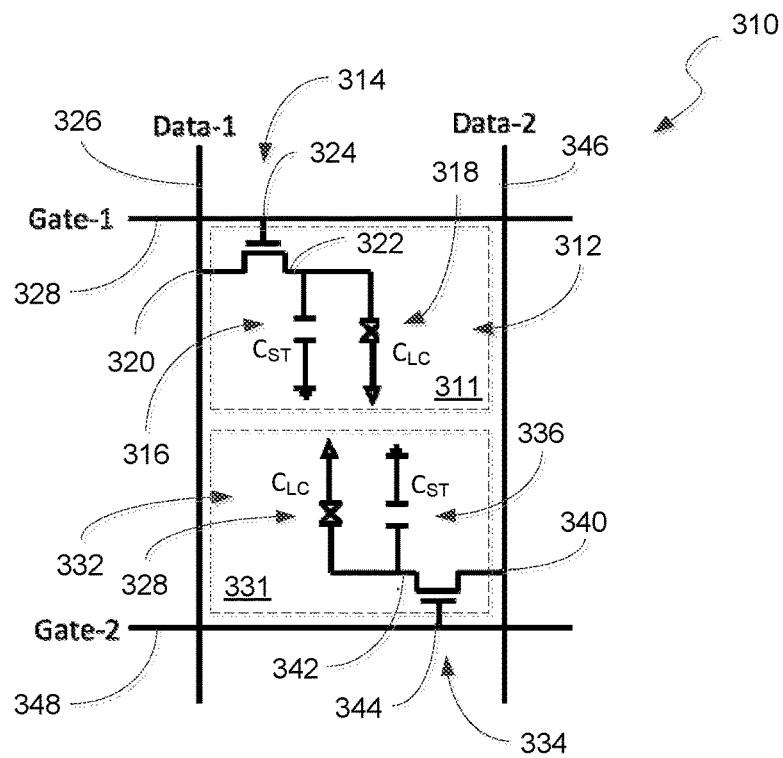
FIG. 9 is a schematic diagram of an embodiment of a pixel element.

FIG. 9 is a schematic diagram of an embodiment of a pixel element (PE) 310 that incorporates an LF sub-region 311 and an HF sub-region 331 associated with LF driving circuit 312 and HF driving circuit 332, respectively. LF driving circuit 312 includes a switch 314, a storage capacitor ($C_{ST}$) 316 and a liquid crystal capacitor ($C_{LC}$) 318. Switch 314 includes a first terminal 320, a second terminal 322 and a gate terminal 324. The first terminal 320 is coupled to a first data line 326 for receiving a first data signal. The capacitors 316 and 318 are coupled in parallel to the second terminal 322. The gate terminal 324 is coupled to a first gate line 328 for receiving a first gate control signal.

HF driving circuit 332 includes a switch 334, a storage capacitor ($C_{ST}$) 336 and a liquid crystal capacitor ($C_{LC}$) 338. Switch 334 includes a first terminal 340, a second terminal 342 and a gate terminal 344. The first terminal 340 is coupled to a second data line 346 for receiving a second data signal. The capacitors 336 and 338 are coupled in parallel to the second terminal 342. The gate terminal 344 is coupled to a second gate line 348 for receiving a second gate control signal.

In this embodiment, the switches 314 and 334 are transistors (e.g., TFTs) that are turned on when the respective gate terminals receive an enabling signal. The liquid crystal capacitors 318 and 338 are formed by BPLC, for example.

In operation, LF driving circuit 312 and HF driving circuit 332 are driven a different frequencies (e.g., 120HZ and 360Hz, respectively). Specifically, gate lines 328, 348 are pulsed at corresponding driving frequencies to enable respective gate terminals 324 and 344. By pulsing the driving switches 314 and 334 at the corresponding frequencies, the driving circuits 312 and 332 control the transmissivity of associated sub-regions of PE 310 in accordance with data signals provided by data lines 326 and 346. As such, the LC mixture used in the PE exhibits reduced temperature sensitivity and a widened working temperature range.

It should be noted that the use of two data lines per PE (such as depicted in FIG. 9) may be preferable in some embodiments. Specifically, TFTs are typically AC-driven, which presents the potential for sub-region to sub-region crosstalk as the polarity of the voltage applied to a sub-region may be inverted with respect to another sub-region. Use of the independent data lines for each sub-region of a PE may alleviate this issue.

It should also be noted that, although each of the driving circuits of the embodiment of FIG. 9 is a standard one transistor and two capacitor (1T2C) circuit, other circuit configurations (such as modified 1T2C TFT, 2T3C TFT, and 4T2C TFT, among others) may be used in other embodiments.

Figure 10:
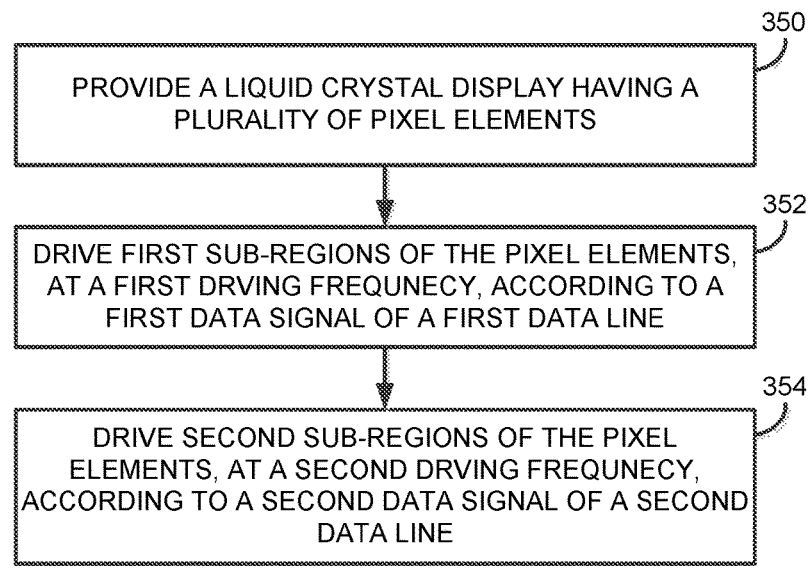
FIG. 10 is a flowchart illustrating basic operations in accordance with another embodiment.

FIG. 10 is a flowchart illustrating basic operations in accordance with another embodiment, such as the embodiment depicted in FIG. 9. As shown in FIG. 10, the functionality (or method) associated with driving an LCD is construed as beginning at block 350, in which an LCD having a plurality of pixel elements arranged in an array is provided. In block 352, a first sub-region of each of the pixel elements is driven, at a first driving frequency, according to a first data signal communicated by a first data line.

Figure 11:
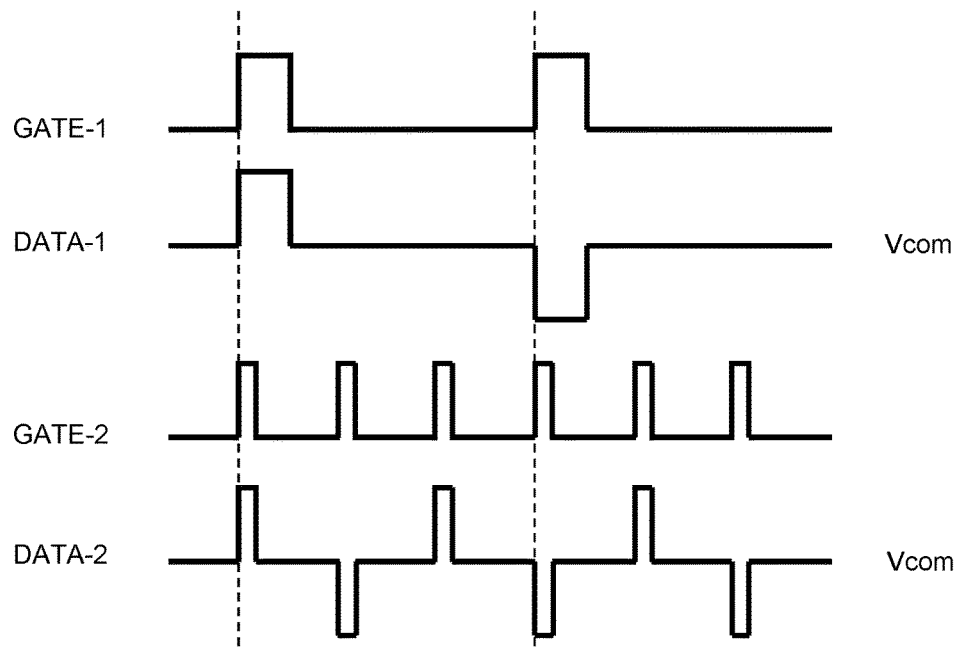
FIG. 11 is a signal diagram depicted representative gate control and data signals that can be used in an example embodiment.

By way of example, the diagram of FIG. 11 depicts representative signals that may be used. In particular, FIG. 11 shows a first data signal (Data-1) and a corresponding first gate control signal (Gate-1), as well as a second data signal (Data-2) and a corresponding second gate control signal (Gate-2). In operation, with respect to the functionality of block 352, the first gate control signal pulses a driving switch associated with the first sub-region to control the transmissivity of the first sub-region in accordance with the first data signal.

In block 354, a second sub-region of each of the pixel elements is driven, at a second driving frequency different than the first driving frequency, according to a second data signal communicated by a second data line. For instance, the second gate control signal (Gate-2) is used to pulse a driving switch associated with the second sub-region to control the transmissivity of the second sub-region in accordance with the second data signal (Data-2). Note that, in the embodiment of FIG. 11, the second driving frequency is higher than the first driving frequency.

Figure 12:
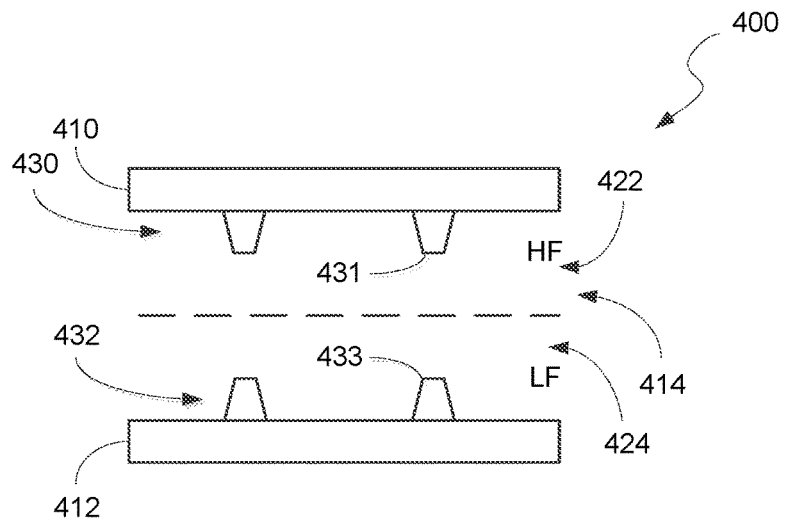
FIG. 12 is a schematic, side view of another embodiment of an LCD system.

FIG. 12 is a schematic, side view of another embodiment of an LCD system 400 configured as LCD panel that incorporates an upper substrate 410, a lower substrate 412 and a large $\Delta\varepsilon$ LC mixture 414 (e.g., BP07) sandwiched between the substrates. As shown in FIG. 12, the LCD system 400 is divided into two sub-regions 422 and 424, with sub-region 422 (HF sub-region) being operated at a higher driving frequency than the driving frequency of sub-region 424 (LF sub-region).

In this embodiment, first pixel elements 430 and corresponding pixel electrodes (e.g., electrode 431) are disposed on upper substrate 410, and second pixel elements 432 and corresponding pixel electrodes (e.g., electrode 433) are disposed on lower substrate 412.

Figure 13:
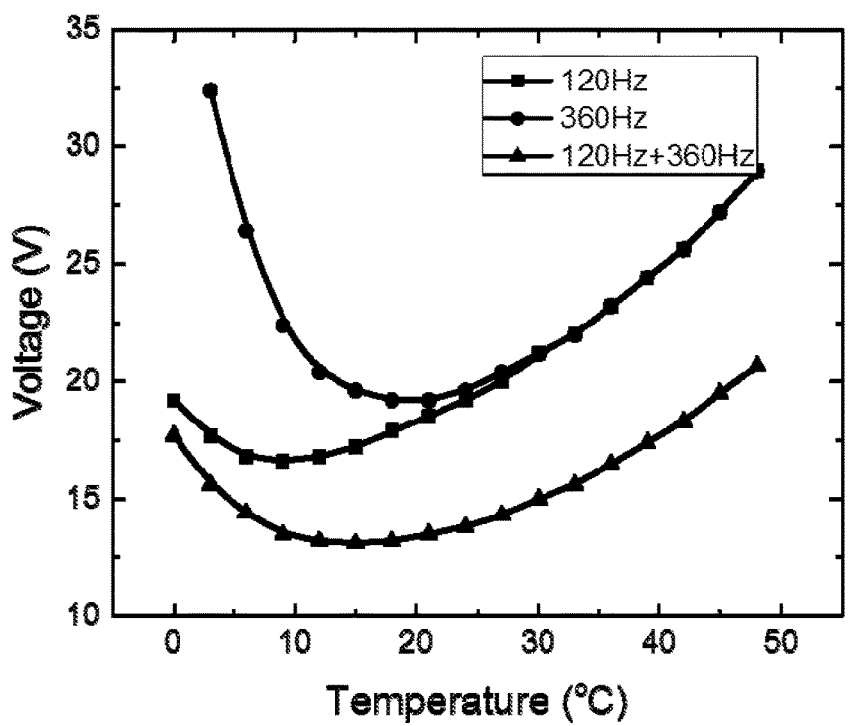
FIG. 13 is a diagram illustrating simulated temperature dependent operation voltages for different driving frequencies (120Hz and 360Hz) and frequency combination (120Hz+360Hz) based on the embodiment of FIG. 12.

Simulated temperature dependent operation voltages for different driving frequencies (120Hz and 360Hz) and frequency combination (120Hz+360Hz) based on the embodiment of FIG. 12 are illustrated in the graph of FIG. 13. Since the light goes through the LF and HF regions (lower and upper) separately and consecutively, the effective Kerr constant would be the sum of these two layers, which means:

$$\Delta n_{ind} = \Delta n_{ind-1} + \Delta n_{ind-2} = \lambda(K_1 + K_2)E^2. \quad (4)$$

Therefore, apart from the wider temperature range, the operation voltage is decreased (<15V) for this embodiment. As is shown, low operation voltage is good for charging, meanwhile voltage less than 15V enables one thin-film transistor (TFT) driving on each substrate. Thus, low cost and ease of driving may be achieved.

The embodiments described above are illustrative of the invention and it will be appreciated that various permutations of these embodiments may be implemented consistent with the scope and spirit of the invention.

What is claimed is:

1. A liquid crystal display (LCD) system comprising:
   a plurality of pixel elements arranged in an array, each of the plurality of pixel elements having a first sub-region and a second sub-region;
   a low-frequency driving circuit operative to drive each of the first sub-regions;
   a high-frequency driving circuit operative to drive each of the second sub-regions at a driving frequency different than a driving frequency of the low-frequency driving circuits;
   the plurality of pixel elements having a plurality of first electrodes associated with the first sub-regions and a plurality of second electrodes associated with the second sub-regions;
   a first substrate upon which the plurality of first electrodes are disposed;
   a second substrate upon which the plurality of second electrodes are disposed; and
   a blue phase liquid crystal material disposed between the first substrate and the second substrate for forming the plurality of pixel elements;
   wherein the low-frequency driving circuit and the high-frequency driving circuit are separately operative to drive the first sub-regions and the second sub-regions simultaneously such that an operating voltage of the plurality of pixel elements is lower than the operating voltage associated with driving both the first sub-regions and the second sub-regions at a low frequency corresponding to the low-frequency driving circuit, and the operating voltage of the plurality of pixel elements is lower than the operating voltage associated with driving both the first sub-regions and the second sub-regions at a high frequency corresponding to the high-frequency driving circuit.

2. The LCD system of claim 1, wherein the first sub-regions are smaller than the second sub-regions.

3. The LCD system of claim 1, wherein the driving frequency of the high-frequency driving circuits is a multiple of the driving frequency of the low-frequency driving circuits.

4. The LCD system of claim 1, wherein the plurality of first electrodes exhibit a different configuration than the plurality of second electrodes.

5. The LCD system of claim 4, wherein the first electrodes exhibit gaps between adjacent ones of the first electrodes that are narrower than gaps exhibited between adjacent ones of the second electrodes.

6. The LCD system of claim 1, wherein a ratio of the size of the first sub-region and the second sub-region is in the range of 1 to approximately 10, but 1 is excluded.

7. The LCD system of claim 1, wherein each of the second sub-regions is at least two times larger or smaller than each of the first sub-regions.

8. The LCD system of claim 1, further comprising:
   a first data line communicating with each of the low-frequency driving circuits;
   a second data line communicating with each of the high-frequency driving circuits;
   a first gate line communicating with each of the low-frequency driving circuits; and
   a second gate line communicating with each of the high-frequency driving circuits.

9. The LCD system of claim 8, wherein:
   each of the low-frequency driving circuits has a first switch, coupled to the corresponding first data line, with a first gate terminal coupled to the corresponding first gate line; and
   each of the high-frequency driving circuits has a second switch, coupled to the corresponding second data line, with a second gate terminal coupled to the corresponding second gate line.

10. The LCD system of claim 1, wherein the low frequency driving circuit is configured to operate in a range of approximately 60 Hz to approximately 120 Hz.

11. The LCD system of claim 1, wherein the high frequency driving circuit is configured to operate in a range of approximately 120 Hz to approximately 480 Hz.

12. The LCD system of claim 1, wherein the operating voltage of the plurality of pixel elements associated with driving the first sub-regions and the second sub-regions simultaneously is lower than 17.5 V for operating temperatures between approximately 0-40° C.

13. A method of driving a liquid crystal display (LCD) comprising:
   providing an LCD having a plurality of pixel elements arranged in an array, a plurality of driving circuits configured to drive the plurality of pixel elements, the plurality of pixel elements having a plurality of first electrodes associated with corresponding first sub-regions and a plurality of second electrodes associated with corresponding second sub-regions, a first substrate upon which the plurality of first electrodes are disposed, a second substrate upon which the plurality of second electrodes are disposed, and a blue phase liquid crystal material disposed between the first substrate and the second substrate;
   driving the corresponding first sub-region of each of the pixel elements at a first driving frequency; and
   driving the corresponding second sub-region of each of the pixel elements at a second driving frequency different than the first driving frequency;
   wherein the low-frequency driving circuit and the high-frequency driving circuit are separately operative to drive the first sub-regions and the second sub-regions simultaneously such that an operating voltage of the plurality of pixel elements is lower than the operating voltage associated with driving both the first sub-regions and the second sub-regions at the first driving frequency, and the operating voltage of the plurality of pixel elements is lower than the operating voltage associated with driving both the first sub-regions and the second sub-regions at the second driving frequency.

14. The method of claim 13, wherein the second driving frequency is a multiple of the first driving frequency.

15. The method of claim 13, wherein the first driving frequency is in a range of approximately 60 Hz to approximately 120 Hz.

16. The method of claim 13, wherein the second driving frequency is in a range of approximately 120 Hz to approximately 480 Hz.

17. The method of claim 13, wherein the operating voltage of the plurality of pixel elements associated with driving the first sub-regions and the second sub-regions simultaneously is lower than 17.5 V for operating temperatures between approximately 0-40° C.

18. An LCD system, comprising:
   a first substrate;
   a second substrate;
   a blue phase liquid crystal material disposed between the first substrate and the second substrate;
   a first electrode disposed on the first substrate;
   a second electrode disposed on the second substrate;
   a pixel element having a first sub-region and a second sub-region;
   a low-frequency driving circuit disposed on the first sub-region;
   a high-frequency driving circuit disposed on the second sub-region;
   a plurality of date lines, with a first of the date lines being coupled to the low-frequency driving circuit and a second of the data lines being coupled to the high-frequency driving circuit; and
   a plurality of gate lines, with a first of the gate lines being coupled to the low-frequency driving circuit and a second of the gate lines being coupled to the high-frequency driving circuit;
   wherein the first electrode corresponds to the first sub-region and is coupled to the low-frequency driving circuit, and the second electrode corresponds to the second sub-region and is coupled to the high-frequency driving circuit;
   wherein the low-frequency driving circuit and the high-frequency driving circuit are separately operative to drive the first sub-region and the second sub-region simultaneously such that an operating voltage of the pixel element is lower than the operating voltage associated with driving both the first sub-region and the second sub-region at a low frequency corresponding to the low-frequency driving circuit, and the operating voltage of the pixel element is lower than the operating voltage associated with driving both the first sub-region and the second sub-region at a high frequency corresponding to the high-frequency driving circuit.

19. A liquid crystal display (LCD) system, comprising:
   a plurality of pixel elements arranged in an array, each of the plurality of pixel elements having a first sub-region and a second sub-region, the plurality of pixel elements having a plurality of first electrodes associated with corresponding first sub-regions and a plurality of second electrodes associated with corresponding second sub-regions;
   a first substrate upon which the plurality of first electrodes are disposed;
   a second substrate upon which the plurality of second electrodes are disposed;
   a blue phase liquid crystal material disposed between the first substrate and the second substrate;
   a first gate signal having a first driving frequency; and
   a second gate signal having a second driving frequency different from the first driving frequency;
   wherein the first sub-regions are configured to receive the first gate signal and the second sub-regions are configured to receive the second gate signal simultaneously such that an operating voltage of the plurality of pixel elements is lower than the operating voltage associated with driving both the first sub-regions and the second sub-regions at a low frequency corresponding to the low-frequency driving circuit, and the operating voltage of the plurality of pixel elements is lower than the operating voltage associated with driving both the first sub-regions and the second sub-regions at a high frequency corresponding to the high-frequency driving circuit.

20. The LCD system of claim 19, further comprising:
   a first data signal having the first driving frequency; and
   a second data signal having the second driving frequency;
   wherein the first sub-region is configured to receive the first data signal and the second sub-region is configured to receive the second data signal simultaneously.

21. The LCD system of claim 20, wherein the voltage (amplitude) of the first data signal is substantially the same with the voltage (amplitude) of the second data signal.

22. A liquid crystal display (LCD) system, comprising:
   a first substrate having a plurality of first electrodes;
   a second substrate having a plurality of second electrodes;

a blue phase liquid crystal layer disposed between the plurality of first electrodes and the plurality of second electrodes;

a plurality of pixel elements arranged in an array, each of the plurality of pixel elements having a first sub-region corresponding to one of the plurality of the first electrodes and a second sub-region corresponding to one of the plurality of the second electrodes;

a first gate signal having a first driving frequency;

a second gate signal having a second driving frequency different from the first driving frequency;

a first data signal having the first driving frequency; and a second data signal having the second driving frequency;

wherein the first gate signal and the first data signal are operative to drive the first sub-region, and the second gate signal and the second data signal are operative to drive the second sub-region such that an operating voltage of the plurality of pixel elements is lower than the operating voltage associated with driving both the first sub-region and the second sub-region at the first driving frequency, and the operating voltage of the plurality of pixel elements is lower than the operating voltage associated with driving both the first sub-region and the second sub-region at the second driving frequency.

23. The LCD system of claim 22, wherein the voltage (amplitude) of the first data signal is substantially the same with the voltage (amplitude) of the second data signal.

\* \* \* \* \*